United States Patent
Suto et al.

(10) Patent No.: US 12,327,419 B2
(45) Date of Patent: Jun. 10, 2025

(54) SANITIZED SURFACE MONITORING AND SMART USER ALERTS

(71) Applicant: Kyndryl, Inc., New York, NY (US)

(72) Inventors: Tiberiu Suto, Franklin, NY (US); Shikhar Kwatra, San Jose, CA (US); Jonathan Cottrell, Canandaigua, NY (US); Carolina G. Delgado, Zapopan (MX); Kelly Camus, Durham, NC (US)

(73) Assignee: Kyndryl, Inc., New York, NY (US)

( * ) Notice: Subject to any disclaimer, the term of this patent is extended or adjusted under 35 U.S.C. 154(b) by 340 days.

(21) Appl. No.: 17/823,844

(22) Filed: Aug. 31, 2022

(65) Prior Publication Data
US 2024/0071112 A1    Feb. 29, 2024

(51) Int. Cl.
*G06V 10/00* (2022.01)
*G06N 20/00* (2019.01)
*G06V 10/82* (2022.01)
*G06V 20/70* (2022.01)

(52) U.S. Cl.
CPC .............. *G06V 20/70* (2022.01); *G06N 20/00* (2019.01); *G06V 10/82* (2022.01)

(58) Field of Classification Search
CPC ........ G06V 20/70; G06V 10/82; G06V 20/20; G06V 20/52; G06N 3/0464; G06N 3/088; G06N 3/09
See application file for complete search history.

(56) References Cited

U.S. PATENT DOCUMENTS

| 9,940,897 B2 | 4/2018 | Guan et al. |
| 10,575,699 B2 * | 3/2020 | Bassa ..................... G05D 1/223 |
| 10,617,951 B2 | 4/2020 | Cohen |
| 2016/0304201 A1 | 10/2016 | Kozloski et al. |

(Continued)

FOREIGN PATENT DOCUMENTS

| CN | 108462861 A | 8/2018 |
| KR | 102075831 B1 | 6/2014 |

(Continued)

OTHER PUBLICATIONS

Anonymous, "Auto Detect and Sanitize Objects (equipment's, vehicles, food items, etc.)," IP.com No. IPCOM000263146D, IP.com Electronic Publication Date: Aug. 2, 2020. Abstract only.

*Primary Examiner* — Amir Alavi
*Assistant Examiner* — Zaid Muhammad Saleh
(74) *Attorney, Agent, or Firm* — CANTOR COLBURN LLP; Erik Swanson

(57) ABSTRACT

A method, computer program product, and system include a processor(s) that map a physical environment by utilizing one or more image capture devices to scan aspects of the physical environment. The mapping identifies contamination levels and features associated with objects in the environment. The processor(s) utilizes unsupervised learning and supervised learning to identify activities engaged in by a user in the environment. The processor(s) determines that a trigger event has occurred. The processor(s) identify an activity engaged in by the user and determine if a user interface utilized by the program code to display results is visible to the user. If the processor(s) determines that the interface is not visible, the processor(s) selects an alert mechanism to alert the user to the trigger event and alerts the user to the trigger event with the selected alert mechanism.

20 Claims, 10 Drawing Sheets

(56) References Cited

U.S. PATENT DOCUMENTS

| | | | |
|---|---|---|---|
| 2017/0213079 A1* | 7/2017 | Herger | G16H 30/20 |
| 2018/0144588 A1* | 5/2018 | Movsisyan | G08B 5/223 |
| 2018/0208207 A1 | 7/2018 | Osotio et al. | |
| 2018/0285649 A1* | 10/2018 | Shi | G08B 13/19613 |
| 2018/0321790 A1 | 11/2018 | Cohen et al. | |
| 2019/0122441 A1 | 4/2019 | Agarwal et al. | |
| 2019/0385272 A1 | 12/2019 | Aoki et al. | |
| 2020/0364884 A1 | 11/2020 | Trim et al. | |
| 2021/0343182 A1* | 11/2021 | Lu | G09B 19/24 |
| 2022/0042912 A1* | 2/2022 | Schindler | G01N 21/6486 |
| 2024/0016455 A1* | 1/2024 | Pinczuk | A61B 5/7275 |

FOREIGN PATENT DOCUMENTS

| | | | | |
|---|---|---|---|---|
| KR | 102153647 B1 * | 9/2020 | | |
| WO | WO-2021086235 A1 * | 5/2021 | | G06K 9/00288 |

\* cited by examiner

_US 12,327,419 B2_

SANITIZED SURFACE MONITORING AND SMART USER ALERTS

BACKGROUND

Physical surfaces can be contaminated with substances that can cause adverse health effects for individuals who come into contact with these surfaces. With the onset of pandemics, a heightened awareness to the activity of contaminants on physical surfaces, especially in public places, is warranted. This is an area of concern especially during a pandemic or illness outbreak. While most stores, libraries, doctor's offices and gyms employ special cleaning procedures to sanitize surfaces for their customers, there is currently no way for a user to verify, independently, which surfaces may have been contaminated, after they have been sanitized.

SUMMARY

Shortcomings of the prior art are overcome, and additional advantages are provided through the provision of a method for alerting users to contaminants in their physical environments. The method includes, for instance: mapping, by one or more processors, a physical environment based on utilizing one or more image capture devices to scan aspects of the physical environment, wherein the mapping comprises identifying contamination levels and features associated with objects in the physical environment; utilizing, by the one or more processors, unsupervised learning and supervised learning to identify activities engaged in by a user in the physical environment; based on the mapping, determining, by the one or more processors, that a trigger event has occurred, wherein the trigger event comprises the one or more processors identifying a contamination level or feature pre-configured to be the trigger event; identifying, by the one or more processors, an activity engaged in by the user; based on the identifying, determining, by the one or more processors, if a user interface utilized by the program code to display results is visible to the user; based on determining that the interface utilized by the program code to display results is not visible to the user, selecting, by the one or more processors, an alert mechanism to alert the user to the trigger event; and alerting, by the one or more processors, the user to the trigger event, based on the selecting, utilizing the alert mechanism.

Shortcomings of the prior art are overcome, and additional advantages are provided through the provision of a computer program product for alerting users to contaminants in their physical environments. The computer program product comprises a storage medium readable by a one or more processors and storing instructions for execution by the one or more processors for performing a method. The method includes, for instance: mapping, by the one or more processors, a physical environment based on utilizing one or more image capture devices to scan aspects of the physical environment, wherein the mapping comprises identifying contamination levels and features associated with objects in the physical environment; utilizing, by the one or more processors, unsupervised learning and supervised learning to identify activities engaged in by a user in the physical environment; based on the mapping, determining, by the one or more processors, that a trigger event has occurred, wherein the trigger event comprises the one or more processors identifying a contamination level or feature pre-configured to be the trigger event; identifying, by the one or more processors, an activity engaged in by the user; based on the identifying, determining, by the one or more processors, if a user interface utilized by the program code to display results is visible to the user; based on determining that the interface utilized by the program code to display results is not visible to the user, selecting, by the one or more processors, an alert mechanism to alert the user to the trigger event; and alerting, by the one or more processors, the user to the trigger event, based on the selecting, utilizing the alert mechanism.

Shortcomings of the prior art are overcome, and additional advantages are provided through the provision of a system for alerting users to contaminants in their physical environments. The system comprises a memory; one or more processors in communication with the memory; program instructions executable by the one or more processors to perform a method. The method can include: mapping, by the one or more processors, a physical environment based on utilizing one or more image capture devices to scan aspects of the physical environment, wherein the mapping comprises identifying contamination levels and features associated with objects in the physical environment; utilizing, by the one or more processors, unsupervised learning and supervised learning to identify activities engaged in by a user in the physical environment; based on the mapping, determining, by the one or more processors, that a trigger event has occurred, wherein the trigger event comprises the one or more processors identifying a contamination level or feature pre-configured to be the trigger event; identifying, by the one or more processors, an activity engaged in by the user; based on the identifying, determining, by the one or more processors, if a user interface utilized by the program code to display results is visible to the user; based on determining that the interface utilized by the program code to display results is not visible to the user, selecting, by the one or more processors, an alert mechanism to alert the user to the trigger event; and alerting, by the one or more processors, the user to the trigger event, based on the selecting, utilizing the alert mechanism.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
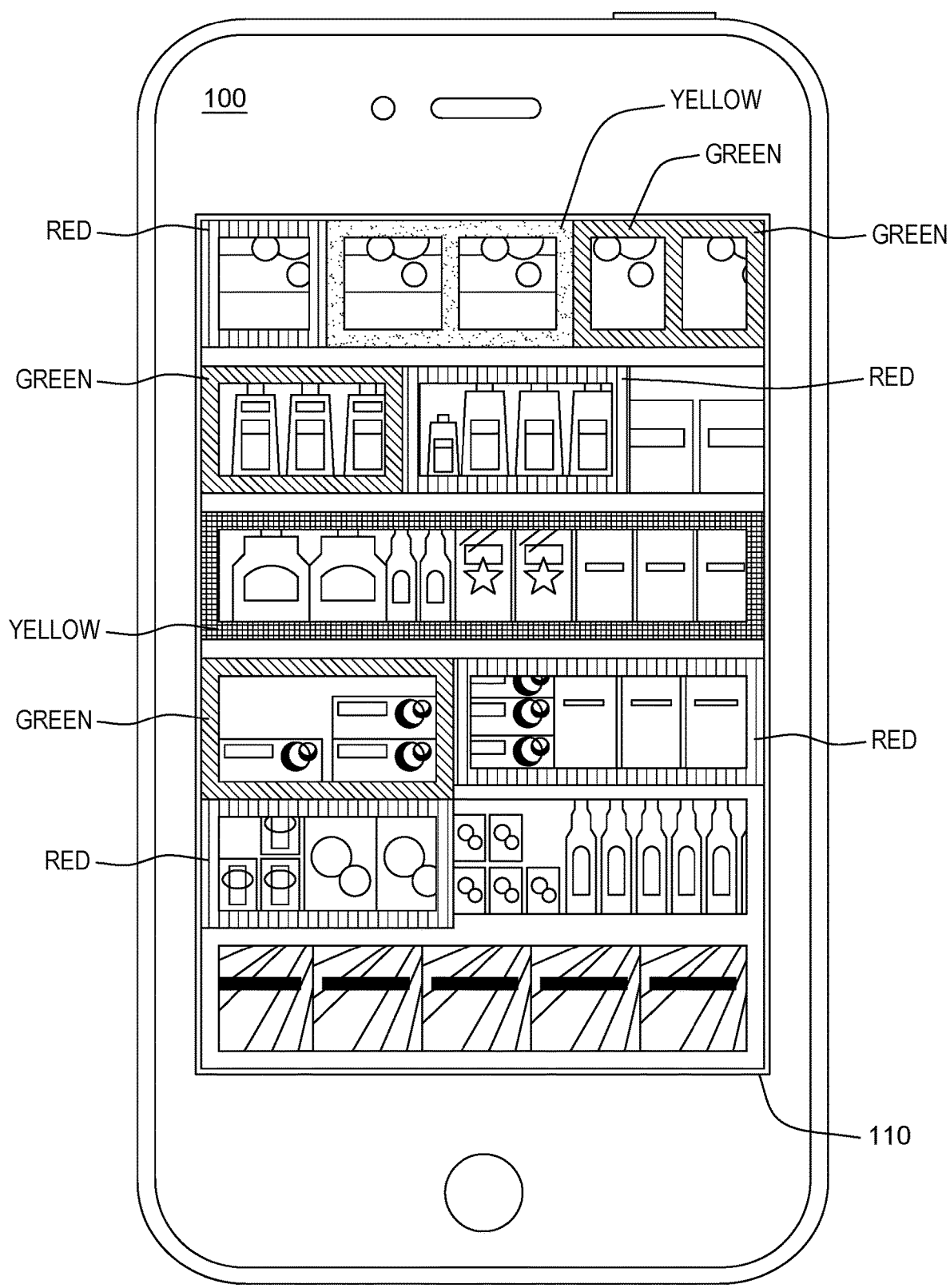
FIG. 1 is an example of an interface generated by program code executing by one or more processors in some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
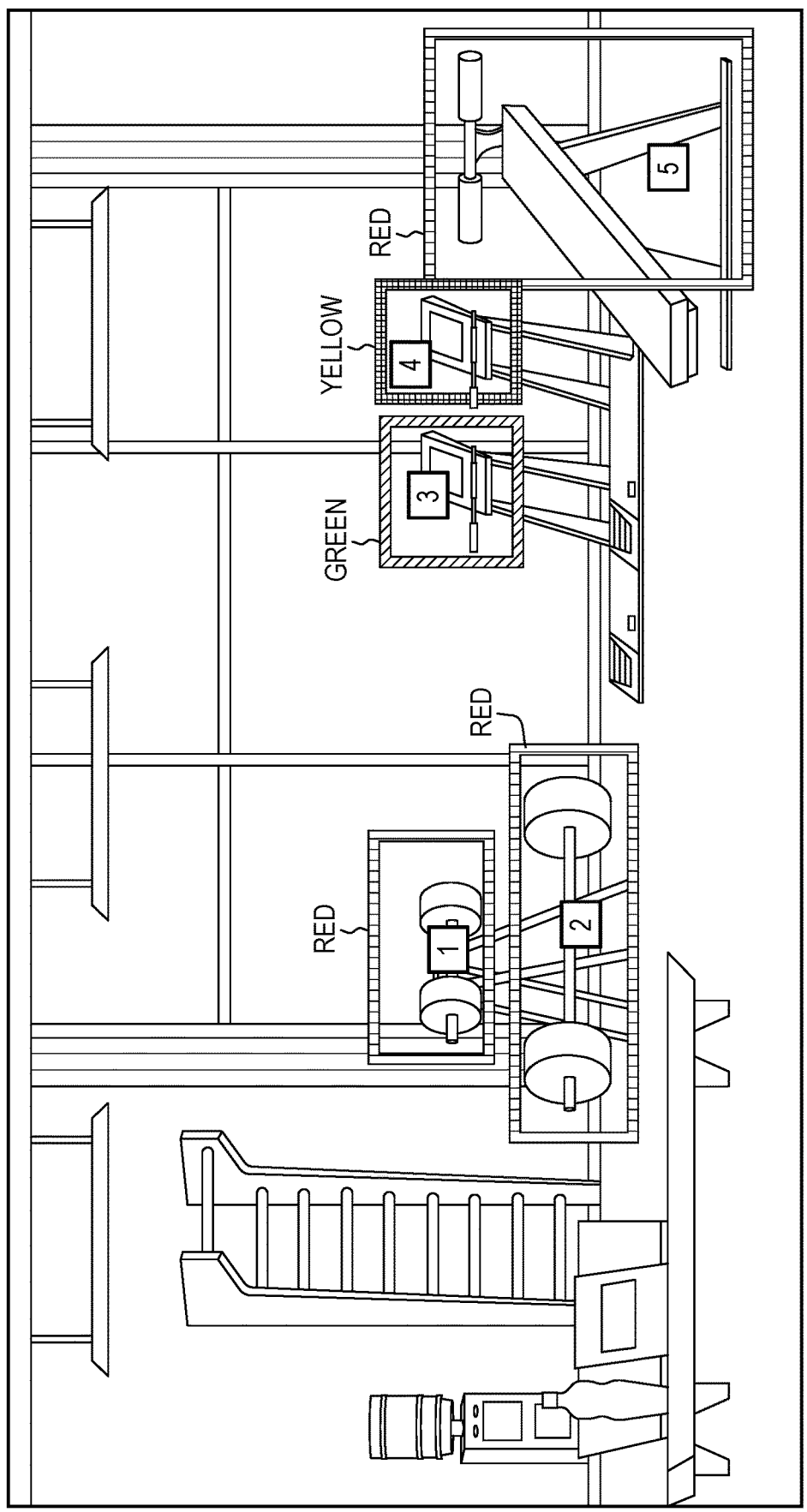
FIG. 7 is an example of a displayed generated by the program code in some embodiments of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include systems, computer program products, and computer-implemented methods that enable users to visually identify safe and potentially unsafe surfaces in their surroundings. By being able to identify these surfaces and comprehend whether contacting the surface is safe, individuals can be proactive and prevent themselves from contacting certain surfaces and thus, avoid contamination from viruses and bacteria on these surfaces. To this end, embodiments of the present invention include systems, computer program products, and computer-implemented methods where program code executing on one or more processors: 1) monitors physical surfaces for safety (e.g., for potential microbial contamination); 2) provides feedback to users regarding the determined safety of the physical surfaces; and/or 3) utilizes a combination of different technological devices and applications to provide this feedback in a manner that manages a cognitive load of attending to and tracking contact with all surfaces. The feedback provided can include surface recognition. In examples described herein, the program code provides feedback to users utilizing devices and methods that include, but are not limited to, augmented reality methods and devices, video cameras, and/or transmission characteristics. Based on the feedback, the program code can automatically initiate various mitigation actions. In some examples, the program code generates reports on the nature of the problem. Furthermore, embodiments of the present invention include various aspects of a graphical user interface which alerts users to any issues utilizing visual indicators, including but not limited to, highlighting identified aspects of surfaces with different colors to differentiate objects and/or surfaces. Embodiments of the present invention can combine monitoring, analysis, and visualization aspect to alert users to surfaces and can also track the contact of the users with the surfaces while assessing the risks associated with these contacts. Program code in embodiments described herein, in addition to overlaying surface/item safety information on an actual physical environment (with a projector) or on a generated display of the current environment (via a graphical user interface), the program code correlates a user's attention in the user's physical environment with a dynamic customized risk stratification mechanism applied in real time in a mixed reality framework, in order to timely deliver safety information to the user.

Embodiments of the present invention provide significantly more than advantages over existing approaches to determining and indicating surface safety. For example, program code executing on one or more processors provide information to users based on surfaces having been recently touched and/or contaminated, including those in a retail setting, such as a store. Additionally, examples herein provide unique visuals to the user to represent surface safety, including through the utilization of mixed reality (MR) technologies. Some examples include a projection system that can be used with an augmented reality (AR) to process and display images from the AR system to provide information about recently touched items to other people in a retail and/or business settings. In some examples, program code executing on one or more processors, provides one or more of haptic and/or audio feedback to a user to provide a safety warning in a timely manner. For example, the program code can scan its proximate environment for contaminants, viruses, or other hazards, as a background process while a user is involved in a different activity of the computing device that would render the results of the environmental analysis performed by the program code. In this case, the program code can provide the user, via the device, with haptic and audio feedback. Thus, a significant improvement of examples described herein is the ability to timely deliver results to a user so that the user's safety is preserved even if the user is engaged in an activity where the user is not focused on the interface utilized by the program code (e.g., a GUI on a display of a personal device, an MR environment, etc.) A significant advantage over existing environmental safety alert systems is that program code in the examples described herein can timely deliver safety information indicated to be of a given importance, immediately, to a user, regardless of whether the user is engaged with the program code at the time the safety issue is identifies by the program code. The program code correlates a user's attention in their physical environment with a dynamic customized risk stratification mechanism to deliver safety information to the user.

Embodiments of the present invention are inextricably linked to computing and provide a practice application. Embodiments of the present invention include a computer-implemented method, a computer program product, and a computer system where program code executing on one or more processors: 1) apply a multi-alert risk stratification strategy to identify and display items in real time that have been recently touched, which may be contaminated (e.g., with viruses and/or bacteria): 2) enable users to prevent illness by avoiding contaminated surface; and/or 3) assist management of the premises to know which areas may require a sanitizing refresh. In some embodiments of the present invention, the program code controls automated devices, including but not limited to, one or more robot and/or other automated cleaning apparatus, to sanitize areas, after the program code determines that these areas represent a risk. Upon completion of the task by the one or more device, the program code can update its mappings to visually reflect a new status for the surface to the user. In some embodiments of the present invention, the program code can map a physical area continuously, periodically, intermittently, etc. To perform these practical applications, as discussed herein, the examples herein utilize various computing technologies. For example, embodiments of the present invention utilize an image capture device, including but not limited to a smart camera. Utilizing the smart camera, the program code utilizes a scanning mechanism such as a one-stage detection model, including but not limited to YOLO (You Only Look Once) and/or SSD (Single-Shot Detector), etc. to determine risk levels in surfaces captured by the image capture device. To determine the risk, the program code, applying a detection model, utilizes a neural network with a varied number of convolutional layers to bound various regions within an image (e.g., physical area) and to predict values (e.g., safety or risk), within the bounded areas. As will be discussed herein, a combination of an image capture device, a detection model (integrated into a scanning mechanisms, a neural network, and a graphical user interface, enable the program code to determine surface safety in a physical environment proximate to a user and to display the safety determinations to the user, in real-time. Through utilization, not only does the program code train the neural network, but the program code learns the most effective methods for alerting a user of safety determinations and updates this model as alerts are provided by the program code. Examples herein are additionally inextricably linked to computing based on the program code utilizing visualization aspects of computing technologies to provide results to a user. In addition to the aforementioned GUI, as will be described herein, certain aspects of the present invention utilize various mixed reality (MR) technologies in order to deliver a desired user experience. Although certain embodiments omit the use of MR, because certain embodiments do utilize MR aspects, MR and certain similar technologies, including virtual reality (VR), and augmented reality (A), are described below.

Virtual reality (VR) typically refers to a simulated experience that can be similar to or completely different from the real world. Applications of virtual reality can include entertainment and educational purposes. Other, distinct types of VR style technology include augmented reality and mixed reality (MR). A person using virtual reality equipment is able to look around the artificial world, move around in it, and interact with virtual features or items. The effect is commonly created by VR headsets consisting of a head-mounted display with a small screen in front of the eyes but can also be created through specially designed rooms with multiple large screens. Virtual reality typically incorporates auditory and video feedback but may also allow other types of sensory and force feedback through haptic technology.

Augmented reality (AR) generally refers to an interactive experience of a real-world environment where the objects that reside in the real world are enhanced by computer-generated perceptual information, sometimes across multiple sensory modalities, including visual, auditory, haptic, somatosensory and/or olfactory. AR can be defined as a system that fulfills three basic features: a combination of real and virtual worlds, real-time interaction, and accurate 3D registration of virtual and real objects. The overlaid sensory information can be constructive (i.e., additive to the natural environment), or destructive (i.e., masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

Mixed reality (MR) is a user environment in which physical reality and digital content are combined in a way that enables interaction with and among real-world and virtual objects. MR glasses, which can also be called AR glasses, are based on mixed reality technology and display three-dimensional (3D) holograms overlaid on the real world. Thus, the user experiences a MR experience as the augmentation of the glasses is combined with the real-world images and both can be viewed by the user of the glasses at the same time. Thus, the user experiences a mixed reality experience. In some examples, the holographic image is generated using light diffraction techniques. AR and MR are both considered immersive technologies, but they are not the same. Mixed reality is an extension of augmented reality that allows real and virtual elements to interact in an environment Mixed reality technologies superimpose a computer-generated image on a user's view of the real world, thus providing a composite view.

In many digital virtual reality (VR), augmented reality (AR), and mixed reality (MR) environments, sensory feedback is used to increase the immersion experience of the user. Sensory feedback refers to the provision of controlled sensory stimulus/stimuli to the user by one or more devices. Haptic, auditory, and visual feedback, corresponding to the senses of touch, hearing, and sight, respectfully, are most commonly used in VR/AR/MR systems, though gustatory (taste) and olfactory (smell) feedback is also possible. Sensory feedback may be unimodal, referring to provision of stimulus/stimuli along a single sense, or multimodal, referring to provision of stimuli along two or more senses. Different users have different sensory preferences and sensitivities, and therefore will respond differently to sensory sensations.

A convolutional neural network (CNN) is a class of neural network utilized by the scanning mechanisms integrated into the image capture devices utilized in various examples herein. CNNs utilize feed-forward artificial neural networks and can be used in certain embodiments herein to analyze visual imagery. CNNs are so named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is not practical to utilize general (i.e., fully connected feedforward) neural networks to process images, as very high number of neurons would be necessary, due to the very large input sizes associated with images. Utilizing a CNN addresses this issue as it reduces the number of free parameters, allowing the network to be deeper with fewer parameters, as regardless of image size, the CNN can utilize a consistent number of learnable parameters because CNNs fine-tune large amounts of parameters and massive pre-labeled datasets to support a learning process. CNNs resolve the vanishing or exploding gradients problem in training traditional multi-layer neural networks, with many layers, by using backpropagation. Thus, CNNs can be utilized in large-scale (image) recognition systems, giving state-of-the-art results in segmentation, object detection and object retrieval. CNNs can be of any number of dimensions, but most existing CNNs are two-dimensional and process single images. These images contain pixels in a two-dimensional (2D) space (length, width) that are processed through a set of two-dimensional filters in order to understand what set of pixels best correspond to the final output classification. A three-dimensional CNN (3D-CNN) is an extension of the more traditional two-dimensional CNN and a 3D-CNN is typically used in problems related to video classification. 3D-CNNs accept multiple images, often sequential image frames of a video, and use 3D filters to understand the 3D set of pixels that are presented to it. In the present context, as discussed herein, images provided to a CNN include images of a culture, including but not limited to, stain images of a culture. The number of layers in the CNN can vary in the examples herein depending upon how the program code herein performs image capture. For example, in embodiments of the present invention that include YOLO, the program code applies a neural network with fewer convolutional layers (e.g., 9 instead of 24) to perform object detection in real-time. YOLO's base network can be understood as a special type of CNN. The program code utilizing YOLO can apply a single neural network (e.g., CNN) to a full image and then, divide the image into regions to predict bounding boxes and probabilities for each region. In other examples, the program code utilizes SSD, applied a CNN on input images to compute a feature map. SSDs and YOLO utilize different types of CNNs. SSDs utilize a CNN (a deep neural network) referred to as a base network or a detection network, YOLO utilizes a CNN called Darknet, which is an open source neural network framework. The architecture of YOLO and SSD vary in that YOLO utilizes two (2) fully connected layers, whereas the SSD network uses convolutional layers of varying sizes.

As noted earlier, embodiments of the present invention include systems, computer program products, and computer-implemented methods that enable users to visually identify safe and potentially unsafe surfaces in their surroundings. FIG. 1 is an example of an interface generated by program code executing by one or more processors in some embodiments of the present invention. As discussed above, the program code in embodiments of the present invention generates indicators on a visual representation of a physical environment to indicates whether surfaces are contaminated. In some examples, such as FIG. 1, the program code generates and overlays frames around items in an observed environment (the observation being in real-time). In some embodiments, users can utilize MR glasses to view these indicators. In others, such as the example in FIG. 1, the user can display the observed environment and the overlaid safety frames in a graphical user interface (GUI) 110 on a display of a personal computing device 100. In this example, the program code differentiates safety levels associated with objects in the immediate environment of the personal computing device 100 by framing the objects in the GUI 110 with different colors, red, yellow, and green. As will be discussed in greater detail herein, in embodiments of the present invention, program code executing on one or more processors analyzes the data from video (e.g., from an image capture device), spectroscopy, and infrared cameras to display different colors to indicate whether a given item is safe to touch. Utilizing colors is just one example of a visual differentiation which can be utilized by a user who perceives and differentiates colors. Other examples can include differing visual cues such as grayscale differences, utilizing different shapes to indicate areas with different perceived safety issues, etc. In this example, the program code utilizes the image capture device integrated into the personal computing device 100 to obtain and display a live feed of a physical environment within the image capture range of the image capture device. The program code then enhances the captured video with the indicators. Depending on the computing device utilized to execute the program game, the implementations of aspects of the invention can vary. For example, in some embodiments of the present invention, rather than displaying safety indicators on a display of a device (in real-time or close to real-time), the program code can project safety indicators, such as colors, directly on real-world items. For example, a user can wear MR glasses and this perceive both the actual physical environment as well as the projections, which augment the "reality" viewed by the user. Although MR glasses or goggles can be utilized with certain embodiments of the present invention, there are various embodiments that do not utilize this technology. In the example provided in FIG. 1, an example in which program code analyzes data from Returning to FIG. 1, in this example, as aforementioned, each color displayed to the user indicates whether a given surface (or an item in a particular area, including but not limited to a cardboard box) is safe to touch, meaning that there is no contaminant recognized by the program code which would be detrimental if touched. In the example illustrated in FIG. 1, which includes multiple colors, as will be described in greater detail herein, the program code indicates an item with a red color to indicate that the item was earlier adjudged to be contaminated and is still potentially contaminated because it is still within the virus or bacteria viability window. The program code highlights an item or surface with the color, yellow, to indicate that a user should handle the item or surface with caution because the program code is not able to detect with a pre-defined accuracy (e.g., ~100% accuracy) if the item or surface is same to touch. For example, the program code can utilize yellow for surfaces or items that were close to an item or surface that was known it be contaminated (e.g., touched). The program code can highlight an item or surface with the color, green, to indicate that although this item or area was touched by a possible contaminant, since that exposure, the item or surface has been sanitized or enough time has passed since the surface was touched or there was an exposure such that the program code can determine that the surface is safe. For example, the program code, having obtained data indicating that the surface was exposed to a given bacteria, can indicate that surface as green because the program code determines that enough time has elapsed since that exposure such that the current time is outside of the viability window for the given bacteria. As a non-limiting example, the program code can indicate that different types of surfaces are same after different amounts of time. While the program code can indicate that a copper surface, because of its anti-bacterial properties, is safe to touch after about an hour post-bacterial exposure, the program code can indicate that a plastic surface is not safe to touch until approximately four hours after post-bacterial exposure.

Thus, in using embodiments of the present invention that utilize color, such as that in FIG. 1, while the program code could indicate that a copper surface is safe, green, after an hour, the program code could indicate that a plastic surface is safe, green, only after four hours have elapsed, assuming that the plastic surface and the copper surface were both contaminated at the same time. In some embodiments of the present invention, the window from contamination to when the program code will indicate that a surface is safe (e.g., green) will vary based on ambient temperature in the environment in which the surface or item that the program code is evaluating in located. For example, in some embodiments of the present invention, if the program code determined that the ambient temperature is above approximately seventy-five (75) degrees Fahrenheit (about 24 degrees Celsius) and the material composition of the surface the program code is evaluating is plastic, the program code can determine that the surface or item is safe to touch after 2 hours instead of after 4 hours in colder temperatures. Thus, the program code can indicate that this surface or item is safe (e.g., green) after the shorter window has passed.

To accommodate both users and displays with color perception challenges. in some embodiments of the present invention, the program code utilizes indicators that are not colored to indicate whether a given surface or item is safe to touch. In one example, the program code displays a single color, for examples, a white frame indicates items that are currently safe to touch because they have been sanitized or are not within the virus or bacteria viability window. In some embodiments, rather than or in additional to providing a visual display, the program code provides haptic feedback. Thus, when a user touches a projected or resolved image of a given surface, the program code generates a haptic response if the representation of the item is unsafe to touch.

Figure 2:
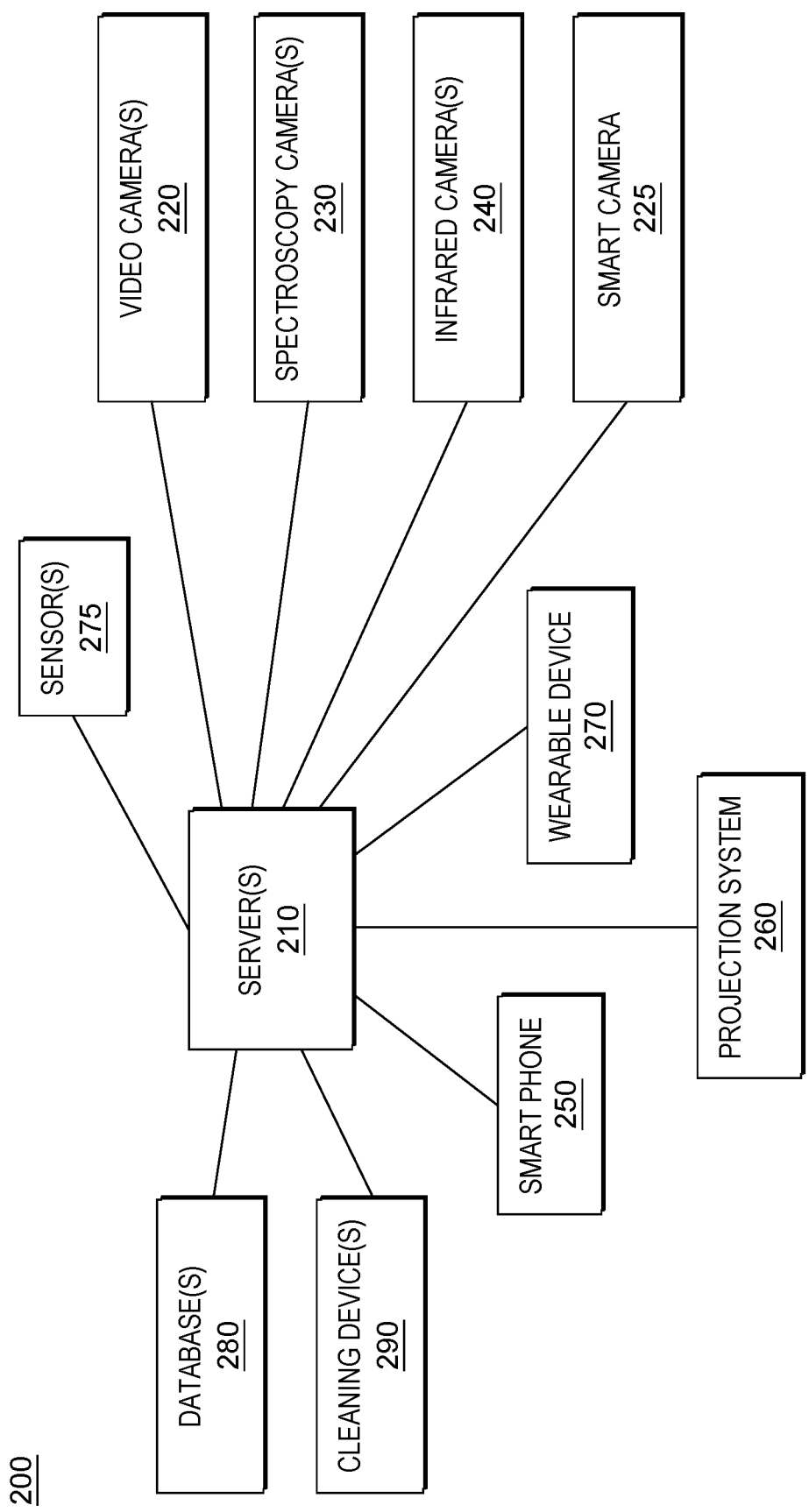
FIG. 2 is an example of a computer system into which aspects of the present invention can be implemented.

FIG. 2 is an example of a computer system 200 into which aspects of the present invention can be implemented. Aspects of the technical environment described herein serve not only to identify potential risks, but also determine how to alert the user to these risks, in real-time. To that end, included in the computer system 200 is one or more servers 210 with one or more processors. The one or more servers 210 are indicated as separate entities for ease of understanding but the processing can be distributed across multiple physical machines and/or across a distributed network, including but not limited to a cloud computing network. The one or more servers 210 are communicatively coupled to various image capture devices, including but not limited to one or more video cameras 220, one or more spectroscopy cameras 230, and one or more infrared cameras 240. These image capture devices can be standalone devices but can also be integrated into personal computing devices, including mobile devices and/or wearable devices, utilized by a user. The program code, executing on the one or more processors, obtains data and/or controls the one or more video cameras 220, one or more spectroscopy cameras 230, and one or more infrared cameras 240 to provide the data which the program code analyzes to determine whether surfaces and/or items proximate to a user are safe to touch. The physical area which the program code can analyze and provide safety information about (e.g., FIG. 1) can be based on the rage of the video cameras 220, the one or more spectroscopy cameras 230, and one or more infrared cameras 240. For example, the filed of vison of these devices can determine the physical area upon which the program code can provide safety information.

Based on the data provided by the one or more video cameras 220, one or more spectroscopy cameras 230, and one or more infrared cameras 240, the program code determines, based on video of the area, material surfaces comprising the area, and ambient temperature of the items and/or surfaces in the area, whether the items and/or surfaces are safe (e.g., within an acceptable pre-configured predicted risk) to touch, if touching certain surfaces or items should be avoided, for safety, and/or the period of time in which touching certain surfaces and/or items should be avoided (for safety).

The one or more video cameras 220 record video of an area proximate to a user. The video is analyzed by the program code (which can execute on the one or more processors 210), to determine whether a given item or surface captured in the video has been touched by an individual and when the touch occurred. As a standalone device (as illustrated for ease of understanding in FIG. 2), included in the one or more video cameras 220, or in a wearable device 270 (e.g., including an MR device, which is discussed later) is at least one smart camera (sensor) 225. A smart camera is a machine vision system which, in addition to image capture circuitry, can extract application-specific information from the captured images, along with generating event descriptions. In some examples, the smart camera 225 is a self-contained, standalone vision system with built-in image sensor in the housing of one or more of the video cameras 220. The term "smart camera" refers to the integration of a vision system and an image sensor into one single piece of hardware known as intelligent image sensor or smart image sensor. The smart camera 225 is illustrated as a standalone device in a video camera 220 in FIG. 2, but it can be integrated into various aspects of the computing system 200, including but not limited to a video camera 220, a wearable device 270 (e.g., an MR device), and/or a personal computing device, such as a smart phone 250.

The one or more spectroscopy cameras 230 provide data to enable the program code to determine the material composition of items and surfaces in the area proximate to the user. As discussed above, different surfaces, when contaminated, can become safe again after varying amounts of time. The one or more spectroscopy cameras 230 detect light reflected off surfaces in the area. Based on these data, the program code determines the material composition of each surface. As noted earlier, different materials have anti-septic properties which affect how long it takes viruses and germs dissipate from these surfaces (e.g., aluminum surfaces can be safer to touch earlier than cardboard surfaces). Additionally, the type of bacteria or virus when coupled with the surface are factors the program code can utilize to determine when to display a surface as same to touch and when to display the surface as contaminated. For example, some viruses may be viable for only 4 hours on a copper surface but 24 hours on cardboard and 72 hours on plastic.

The program code obtains the video feed from the one or more video cameras 220 and the spectroscopy data from the one or more spectroscopy cameras 230. The program code overlays the spectroscopy data over the video feed to determine the viability of viruses or bacteria on the various surface in the area. The program code utilizes a combination of the spectroscopy data and the video feed to identify surface types; the spectroscopy cameras 230 augment the video feed such that the program code can perform an enhanced calculation to determine when a particular surface (in a range in which the program code will display) becomes safe to touch. For example, if the program code determines that a cardboard surface was touched at a given time, the program code can determine when this surface will be safe to be touched again, as bacteria and viruses will have dissipated at this future time, based on the timing of the touch and the composition of the surface.

The one or more infrared cameras 240 detect the ambient temperature of the items and/or surfaces in the area. Because the ambient temperature affects how long it takes viruses and germs to dissipate from surfaces, the program code incorporates this data into calculation to determine when surfaces and items that have been touched will become safe (or have a reduced risk of being contaminated within a pre-defined acceptable range). Thus, the program code utilizes these data in addition to the surface data and data indicating when certain surfaces have been touched to determine whether certain surfaces are unsafe and how long the unsafe condition will continue.

As discussed above, an advantage of the examples herein is that surface or items safety information is determined, by the program code, in real-time, and provided, by the program code, to the user, in real-time. The program code visually provides the information to a user, as illustrated in FIG. 1, utilizing one or more of a display on a personal computing device, such as a smart phone 250, and/or a projected image from a projection system 260. Certain aspects of the projection and/or the display on the screen can be enhanced via the utilization of a wearable device 270, including but not limited to VR or AR goggles or MR lenses or an MR headset. The display apparatus, whether it is a smartphone 250, a projection system 260, a wearable device 270, or all three, are communicatively coupled to the one or more processors 210. In examples where the program code displays results on a smart phone 250, an AR device, such as VR or AR goggles MR lenses or headsets, can utilize data from the smartphone display to enhance the view for the user. In some examples that utilize a projection system 260, the program code utilizes the projection system 260 like a projector in a movie theater to overlay colors or other indicators directly on items and/or surfaces in the physical environment of the area. The program code can present an overlay of digital content that interacts with objects in the real world in real-time.

The functionality of the wearable device 270 as well as AR aspects executed by the program code are enabled by one of more sensors 275 proximate to the physical environment the program code and various image and data capture devices are monitoring. In some examples, one or more sensors 275 can be integrated into a personal computing device of a user, including but not limited to, the smart phone 250. In some examples, one or more sensors 275 are utilized to support the AR/VR capabilities of the computing system 200. The one or more sensors 275 can include, but are not limited to, motion tracking and/or listening/voice recognition sensors. In some examples, the one or more sensors 275 can include an inertial measurement unit (IMU) that can include an accelerometer, a gyroscope, and/or a magnetometer. The program code utilizes data collected by the one or more sensors 275 to determine one or more of where the user is located, what the user is viewing, how the environment is changing, etc.

In some embodiments, some of the program code is can be executed on the smart phone 250. Even if the program code smart phone 250, the program code can obtain inputs from the smart phone 250 which can affect the functionality of the program code. Thus, a user can utilize an interface available via the smartphone 250 (or other personal computing device) to customize certain aspects of the functionality. For example, users can utilize a GUI to select which bacteria and viruses they would like the program code to identify as problematic. In this example, the visual display to the user, whether via the smartphone 250, a projection system 260, and/or wearable device 270, can display safe and/or hazardous areas based on the inputs provided by the user. For example, the program code can provide the user with an interface on a personal device, such as a smartphone 250, with a list of possible bacteria and viruses which the program code can identify on surfaces and/or items in a vicinity of the user. The user can select, in the list, the bacteria and viruses of concern. In order to identify various bacteria and viruses on given surfaces, the program code can access various databases and resources 280. Thus, the program code can utilize data obtained from the one or more video cameras 220, the one or more spectroscopy cameras 230, and the one or more infrared cameras 240 and utilize various object recognition technologies, including but not limited to YOLO, with its underlying CNN, as well as various databased and resources 280 to determine whether the contaminants are present on items and/or surfaces proximate to the user.

In some examples, when the program code can identify different viruses and/or bacteria, the program code can determine an approach to provide the user with the most conservative view of the safety of a given area. This approach can be related to the viability of various viruses which the program code is configured to identify. Based on the selections of the user (and/or preconfigured setting in the system), the program code can identify, select, and apply algorithms, which, in combination, the program code has determined will reflect the most secure and accurate scenario of combinations of different viruses and bacteria viability. For example, if someone chooses different viruses that live for two (2) and four (4) hours, respectively, the program code will display the virus with the longest viability on the surface and utilize display factors, such as colors, to indicate safety based on the life of this virus. The approach can be related to the prevalence of a given virus or bacteria in a given area. For example, based on obtaining data related to infection rates in a given area, the program code can select a prevalent infection and automatically add identifying and alerting a user based on this infection to any user and/or system settings.

Certain examples herein also include one or more robotic cleaning devices 290. The one or more robotic cleaning devices 280 are communicatively coupled to the one or more processors 210. When the program code determines that a given object or surface has been touched (and hence, possibly contaminated), the program code controls and/or communicates with the at least one of the one or more robotic cleaning devices 290 so that this device can sanitize the surface. When a surface is sanitized by a robotic cleaning device 290, the program code updates the visualization (e.g., FIG. 1) and/or projection to indicate to a user that the sanitized surface can be touched without the former safety concern. As aforementioned, different contaminants, such as viruses and bacteria, can vary in viability (e.g., some are viable on items and/or surfaces for 4 hours while others are viable for 24 or 72 hours). The program code accounts for these differences when generating a visualization (projection, image in a GUI, full or partial image compatible with VR or AR goggles, etc.) of a given area with indications of the safety ratings or levels of various items or surfaces. For example, the program code determines a safety rating for a given item or surface (in the range of the one or more video cameras 220, the one or more spectroscopy cameras 230, and the one or more infrared cameras 240) and displays a specific indicator (color, symbol, etc.) depending, in part, on the viability of the contaminant the program code identifies.

As noted above, in embodiments of the present invention, the program code correlates a user's attention in the user's physical environment with a dynamic customized risk stratification mechanism applied in real time in a mixed reality framework, in order to timely deliver safety information to the user. This functionality is aided by the smart camera 225, which can be embedded into various aspects of the computing system 200, including but not limited to a video camera 220 and/or a wearable device 270 (e.g., an MR device). The smart camera 225 van be modularized with a scanning mechanism such as a one-stage detection model, including but not limited to YOLO. Specifically, certain embodiments of the present invention utilize YOLO version 4 (YOLOv4). However, YOLO is provided as merely one example of an object-recognition approach that can be utilized in embodiments of the present invention. It is described for illustrative purposes but one or skill in the art will recognize that additional technological approaches can be substituted to perform object recognition and the additional tasks described herein. When YOLO is utilized, the program code applies YOLO, which is based on a CNN, so that the CNN divides an image into regions and then it predicts the boundary boxes and probabilities for each region. It simultaneously predicts multiple bounding boxes and probabilities for those classes. Program code utilized YOLO to see an entire image during training and test time so the program code can it implicitly encode contextual information about object class and appearance. The program code, which includes YOLO or a similar technology, comprises a real-time object recognition system that can recognize multiple objects in a single frame. In an example that utilizes YOLOv4, the CNN is CSPDarknet53, which is a convolutional neural network and backbone for object detection that uses DarkNet-53. YOLOv4 employs a CSPNet (Cross Stage Partial Network) strategy to partition the feature map of a base layer into two parts and then merges them through a cross-stage hierarchy. DarkNet-53 is a convolutional neural network that is 53 layers deep. It is useful in image recognition contexts because a pretrained version of the network can be integrated into the computing system 200. The pre-trained network was trained on more than a million images and can classify these images into at least 1000 object categories. Thus, certain of the basic training is complete and additional trained can be accomplished through machine learning within the computing system 200. In some examples, the image recognition facility, which can include YOLO, is executed by the program code on a graphics processing unit (GPU).

Figure 3:
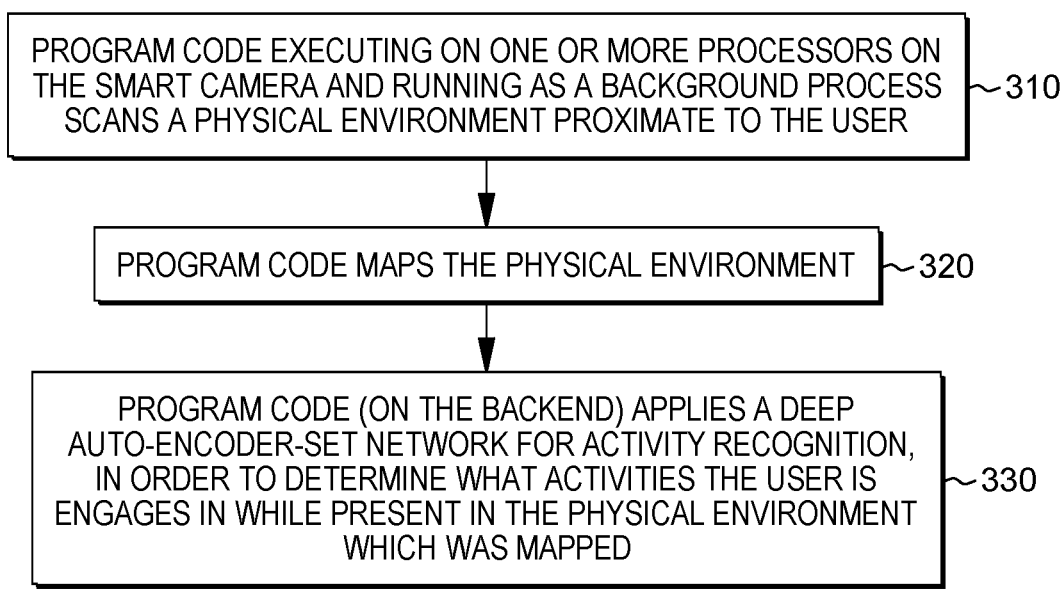
FIG. 3 is an example of a workflow that illustrates certain functionalities of the examples herein, including providing environmental safety information about a physical environment to a user, in real-time, while a user is engaged in various activities including activities that cause the user not to focus on personal safety within the physical environment.
Figure 4:
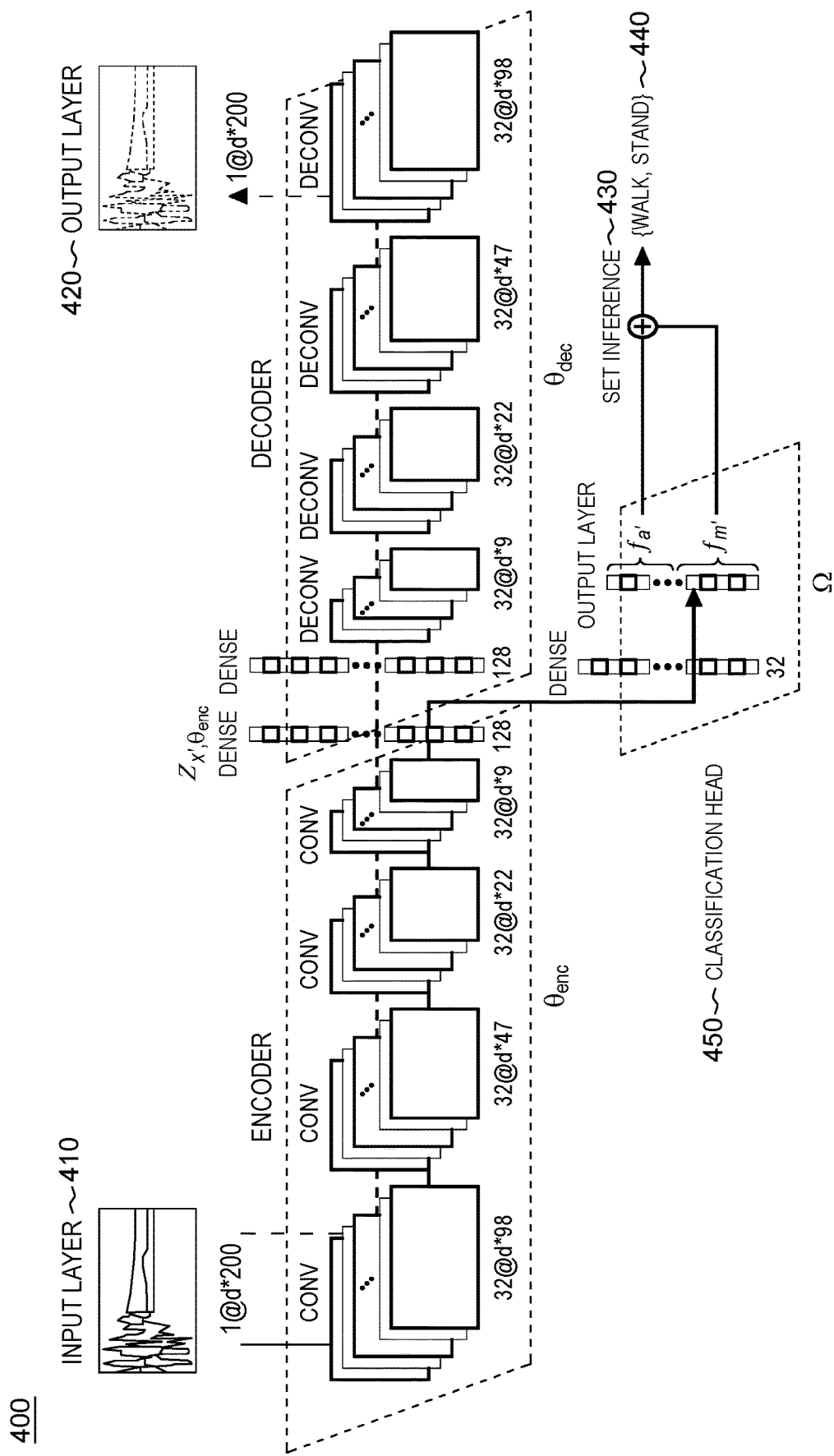
FIG. 4 illustrates an architecture of the learning aspects by which a program code can identify user activities in some embodiments.

FIG. 3 is a workflow 300 that illustrates certain functionalities of the examples herein, including providing environmental safety information about a physical environment to a user, in real-time, while a user is engaged in various activities including activities that cause the user not to focus on personal safety within the physical environment. The computing system 200 of FIG. 2 is referenced throughout the description of FIG. 3 for illustrative purposes. In the example illustrated in FIG. 3, program code executing on one or more processors, which can include a GPU, (utilizing object recognition such as YOLO) on the smart camera 225 and running as a background process scans a physical environment proximate to the user (310). The program code maps the physical environment (320). As discussed earlier, the program code can map the physical environment based on this scan to create a map that it will reuse. Alternatively, the program code, because it runs as a background process, can periodically, continuously, and/or intermittently scan the physical environment and update the map it generates to reflect any temporal shifts. The program code (on the backend) applies a Deep Auto-Encoder-Set Network for Activity Recognition, to determine what activities, the user is engaged in while present in the physical environment which was mapped (330). In some examples, to determine the activity of the user, the program code utilizes a CNN and engages in unsupervised and/or supervised learning. FIG. 4, which is discussed in greater detail below, illustrates an architecture 400 of the learning aspects by which the program code can identify user activities.

To determine (e.g., automatically recognize) what activities a user is engaged in over time, the program code automatically recognizes human activities from time-series sensor data (referred to as human activity recognition or HAR). The Deep Auto-Encoder-Set Network for Activity Recognition is applied to datasets obtained via one or more wearable sensors, including but not limited to the wearable device 270. The program code obtains high-level activity information by analyzing low-level sensor recordings. Various sensors and data sources can include, but are not limited to, sensor data from the smartphone 250, one or more video cameras 220, one or more spectroscopy cameras 230, and one or more infrared cameras 240. Utilizing the sensor data from a series of times, the program code predicts activities of the user moving forward. Thus, the program code can predict a set of ongoing activity elements within a duration of a time segment. A user who can view results generated by the program code, whether on a device screen or in a projection, is able to view warnings provided by the program code, including those related to trigger events. A user who is unable to view the results may not be able to appreciate timely hazards identified by the program code. To determine whether a user is engaged with a display utilized by the program code, the program code determines what activity a user in engaged in at a time relevant to the occurrence of a trigger event (e.g., contemporaneous with a trigger event, proximate to a trigger event, within a predefined time of the trigger event, etc.).

In order to determine the activity in which a user is engaged the computing system 200 (FIG. 2) comprises program code and sensors that comprise an HAR system. The program code can perform activity set learning and inference in a systematic fashion using existing deep learning paradigms. The sensors, which include wearable sensors, provide data streams, recording human activity, such that the program code can recognize the activities and predict human activities are future times. In order to perform activity recognition, the program code implements an existing pipeline of aspects for analyzing time series sensory data (from the sensors), which includes: sliding window segmentation, feature extraction, and/or activity classification. In embodiments of the present invention, the program code utilizes a Deep Auto-Encoder-Set Network for Activity Recognition by: consuming raw sensory data (from the aforementioned sensors, including wearable sensors) and automatically extracting distinctive features and outputs corresponding sets of activities with various cardinalities. Using deep learning in HAR, the program code can perform end-to-end feature extraction, which alleviates the need for feature engineering procedures. The program code can utilize a CNN to automatically extract high-level features by enabling the raw sensory data to be processed by the convolutional layers of the CNN such that the program code can extract discriminative features. In embodiments of the present invention, the program code associates segmented sensory data with a set of activity elements in order to classify and/or predict an activity in which a user in engaged with a device sufficient to receive alerts for surface and/or item safety.

In some embodiments of the present invention, the program code classifies certain of the recognized activities as activities in which a user would receive an additional alert based on a trigger event and activities in which a user would not receive an alert based on a trigger event. In some embodiments, the user can configure which activities would warrant an alert and which would not. In some examples, the program code assigns various activities to different levels of engagement. For example, the program code can assign a user starting into the distance as a level 2 (of 1-3 where 1 is engaged and 3 is not engaged) and an activity of texting a 3. The program code can be configured to send an alert for a trigger event based on a given threshold. In some examples, the user can configure the program code to send an alert when the activity level is greater than 2 and/or greater than or equal to 2.

As aforementioned, FIG. 4 provides an example of a unified architecture 400 for a Deep Auto-Set network. In some embodiments of the present invention, the program code predicts and/or identifies human activities based on the program code engaging in both unsupervised and supervised learning. In FIG. 4, tags above the feature maps refer to the corresponding layer operations. The numbers before and after "@" respectively correspond to the number of generated feature maps and their dimensions in each layer. This architecture 400 of FIG. 4 is provided as a non-limiting example of an architecture that can be utilized in various embodiments of the present invention. As illustrated in FIG. 4, all convolution (and deconvolution) layers apply a filter of width 5 and stride 2 (for down-sampling) along the temporal dimension of the feature maps. In an unsupervised aspect (certain aspects of other feature recognition methods which can also be utilized in various embodiments of the present invention utilize supervised machine learning), starting from the input layer, layer operations on the dashed arrow are consecutively applied on the generated feature maps of previous layers to output the reconstructed segment FIG. 4 also illustrates a supervised step, where the program code sets parameters for various activities (e.g., operations on the solid arrow in FIG. 4). Once the program code optimizes network parameters, the program code infers sets (of activities). Illustrated in FIG. 4 is an input layer 410 and an output layer 420 of the CNN. The program code classifies activities performed by the user at various times utilizing a classification head 450. The program code can infer from an existing set 440 (e.g., supervised learning), a given activity in which the user is engaged, at a given time.

In embodiments of the present invention, the program code can adopt convolutional auto-encoders to utilize unlabeled time-series data to learn feature representations. For example, the program code can adopt convolutional auto-encoders. As aforementioned, the program code in embodiments of the present invention engages in both unsupervised as well as supervised learning in order to identify and/or predict an activity in which a user is engaged. The program code utilizes this information to determine how to notify a user of a safety concern proximate to the user. In some examples, the program code obtains cheaply accessible unlabeled sensor measurements (in an unsupervised aspect), and the (in a supervised aspect), leverages label information (e.g., from an existing data source) to extract more discriminative features while training the program code to generate activity sets for the given sensory data. In the unsupervised aspect, which is a machine learning aspect, the program code can construct a symmetric convolutional auto-encoder by arranging a chain of deconvolutional operations in the decoder network symmetric to the convolutional layers in the encoder network. In the supervised aspect, the program code augments the encoder network with a multi-label classification head and adjust an output layer. In some embodiments, these convolution (and deconvolution) operations can be applied by the program code along a temporal dimension of feature maps to automatically uncover temporal signal patterns within the time span of filters.

Figure 5:
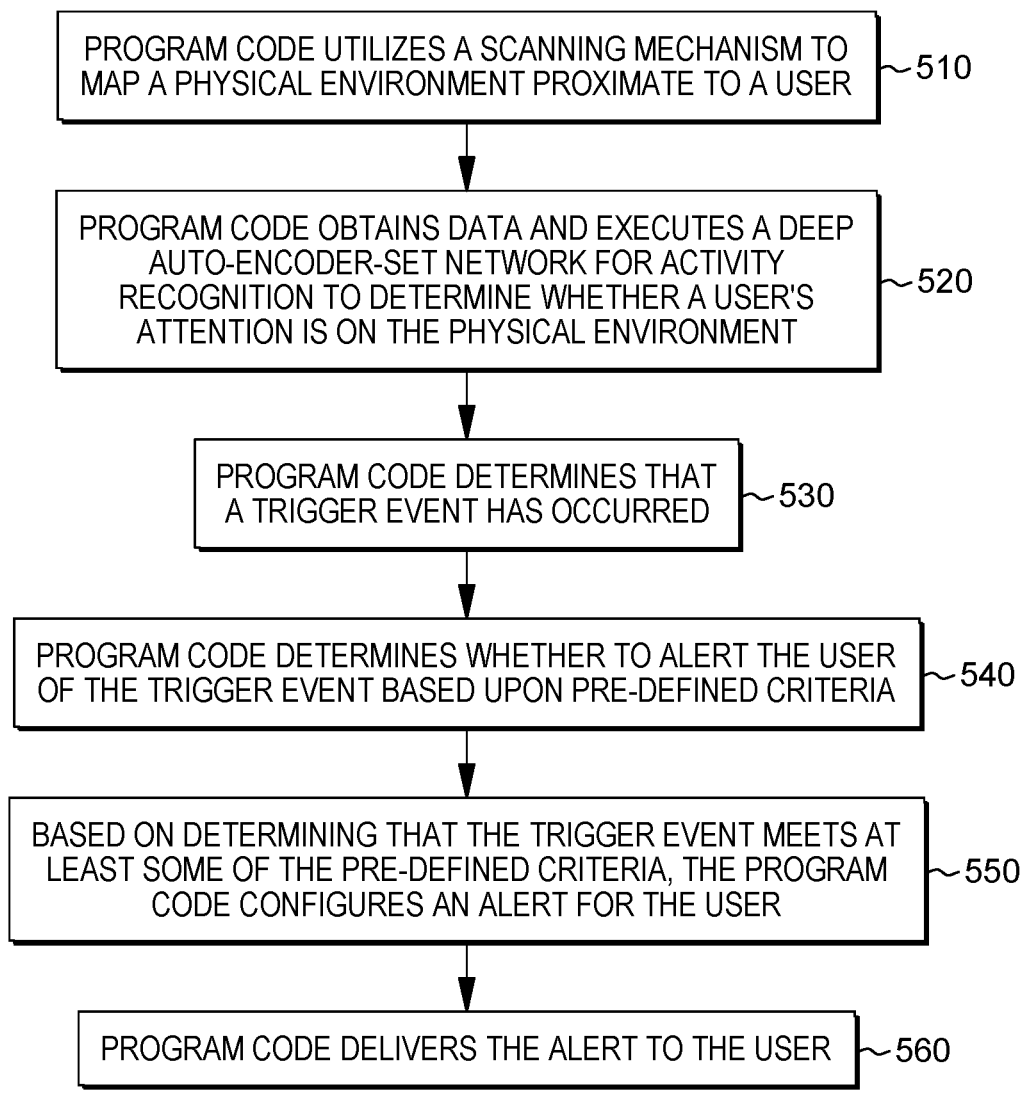
FIG. 5 is a workflow that illustrates how various aspects of the systems and methods described herein work together.

FIG. 5 is a workflow 500 that illustrates how various aspects of the systems and methods described herein work together to: 1) scan and map the safety of a given physical environment; 2) determine whether results should be conveyed to a user; 3) determine whether the user is engaged in an activity that would enable the user to obtain the results; and 4) deliver the results to the user. FIG. 5 also illustrates aspect of an alert methodology utilized in certain examples, In FIG. 5, program code (e.g., a smart camera embedded within an MR device, the various cameras and image capture devices in FIG. 2) utilizes a scanning mechanism (e.g., YOLOv4) to map a physical environment proximate to a user (510). The program code can run as a background process when mapping the environment such that no inputs or manual interactions are needed from the user. Thus, the user can engage in various activities while the program code performs the scanning. The program code comprising the field scanner (which can run a YOLO model), monitors the environment, which includes monitoring positioning of different objects (items, surfaces, etc.) which may/may not be contaminated. While performing the scanning, the program code can access various databases and utilize object recognition technologies to identify contaminants in the physical environment. The program code monitors information captured from objects nearby by depth sensors and by placing contours (e.g., C) around objects. The program code can perform multi-class classifications in order to categorize the objects in the vicinity in danger levels of varying contamination. Thus, the program code can scan its proximate environment for contaminants, viruses, or other hazards, as a background process while a user is involved in a different activity of the computing device that would render the results of the environmental analysis performed by the program code.

Program code obtains data from wearables and/or other sensors proximate to the user and executes a Deep Auto-Encoder-Set Network for Activity Recognition to determine whether a user's attention is on the physical environment (520). As explained above, using the Deep Auto-Encoder-Set Network for Activity Recognition, the program code determines what activity a user is engaged in at a given time. Certain activities would enable a user to be attentive to the user's physical environment, such as hiking, while other activities, such as reading, may foreclose this option. Thus, based on identifying an activity in which a user is engages, the program code can determine a likelihood of whether a user is attentive to the user's physical environment. The program code determines targets of a user's attention based on the program code applying an encoder-decoder network model. By applying this model, the program code can consistently and/or constantly monitor the activity of the user, based on a time series analysis performed by the program code (e.g., FIG. 4). For example, if one considers field of view of "f" in a physical environment "P", and user's attention is "A" is predicted via the encoder model (based on determining an activity in which user is engaged). If the program code, applying the model, determines that a user switches, for example from activity "A' to activity "A'", then the program code can determine, based on the switch, that user is not engaged with environment "P".

The program code notifies the user of an environmental hazard in various ways based on determining that a trigger event has occurred. This, in FIG. 5, the program code determines that a trigger event has occurred (530). A possible trigger is that the program code determines that the user is switching activities and/or engaged in an activity where the user is not focused on the physical environment. The program code determines whether to alert the user of the trigger event based upon pre-defined criteria (540).

The program code utilizes a smart interjecting strategy which is interleaved amidst the session. Thus, the program code will not interrupt the session (e.g., the activity that a user is engaged in) except if certain settings (whether customized by the user, an administrative user, and/or pre-configured) indicate that the trigger meets various pre-defined criteria. Thus, various embodiments of the present invention allow for customization of alerts based on severity levels monitored by the (e.g., AR) sensory devices and/or the various cameras through continuous visual monitoring.

Based on determining that the trigger event meets at least some of the pre-defined criteria, the program code configures an alert for the user (550). The program code delivers the alert to the user (560). When a user in engaged with a GUI displaying results determined by the program code, the program code displaying results that include the trigger event can communicate these results to the user. However, if a user is engaged in an activity where the user's attention is otherwise engaged (e.g., playing an online game, not visually engaged with an interface or projection, etc.), the user may not view the results in a timely manner, resulting in the user interacting with the hazard the user is being warned of. Thus, when the program code determines that a user is engaged in an activity that is incompatible with monitoring a display and/or an activity in which the user is less likely than not to be monitoring a display (in some examples the program code can utilized a pre-defined threshold model), the program code can alert the user to the trigger event via other means, including but not limited to, audio and/or haptic feedback. For example, if a user is engaged in an online game at a time proximate to the trigger event (e.g., within a pre-defined time window), the program code can determine that alerting to user would engage (or further engage) the user. In another example, the program code could determine that the user is engaged and/or recently engaged in an activity (in a pre-defined time window proximate to the trigger event) where the user's attention (e.g., focus) is not on an interface utilized by the program code (e.g., exercising, playing an online game, texting a friend, looking in a direction where an interface utilized by the program code is not within the line of vision of the user), and based on this determination, alert the user to the trigger event. Because the program code can obtain data that enables the program code to evaluate, for example, whether a user is engaged with an interface in which the program code will display results, the program code can determine whether to alert a user (outside of displaying the alert in the user interface or projecting the data in a physical setting).

Based on the activity in which the user is engaged and the program code determining the user's engagement (or lack thereof) with the physical environment (based on utilizing Deep Auto-Encoder-Set Network for Activity Recognition), the program code determines the type of alert that would provide the user with the safety information quickly and efficiently. The program code profiles the user's level of awareness of the outside world while engaged in a particular activity. If the activity prediction output stochastic indicates a low level of sensory surrounding awareness, the system simultaneously alters the alerting strategy with a time series analysis. This strategy can include: relevant information overlay, audio interleaving, visual injection into ongoing visual session, and/or haptic feedback via connection through other wearable devices based on constantly monitoring implicit feedback from the user and risk stratification. The haptic and audio feedback can be utilized to alert users who are not paying attention in an MR environment and are engaged is engaged in performing an alternate activity (e.g., playing a network game, participating in an MR-enabled conference session, etc.). A user who is engaged in this type of activities is less likely to be aware of the user's physical surroundings.

Based on a user's response to alerts, the program code can generate and update a user profile that stores rankings of most effective and least effective (and timely) ways of alerting a user when a trigger event occurs. The program code monitors user response to various alert strategies and generates and updates a profile for the user based on most effective alert strategies. For example, the program code can determine that a given user responds to haptic feedback more quickly than to an audio alert. The program code can also determine that the efficacy of various alerts, over time, for a user vary depending upon the activity in which the user is engaged. For example, a user who is playing an online game could respond more quickly to an audio alert while the same user, who is jogging, could respond more quickly to receiving haptic feedback. One way in which the program code can compare the efficacy of different alert methods for the same user is to time how long after an alert a user views the program code's visualization of a trigger event. This value can be determined by the program code by receiving sensor data from sensors proximate to a user as well as associated with a personal computing device of a user. For example, the program code can determine and save a timing value that reflects the timing from the alert to the user viewing the data related to the trigger event (as generated and visualized by the program code). Thus, as the program code continues to alert the user, the program code learns how to attract the attention of the user (as the activities on the user are continually monitored by the program code as part of identifying the activities in which the user in engaged when the program code identifies trigger events). The program code can rank the alert mechanisms (e.g., audio interleaving, visual injection into an ongoing visual session, haptic feedback, auditory feedback, etc.) based on efficacy level where a higher efficacy level translates to a shorter timing value and save these efficacy levels for the user in the user profile. The program code can utilize the responses of the user to the alerts to generate a model, a user profile, and in some examples, can apply the model when alerting the user. The program code can continue to monitor user response and thus can tune the model to the most recent user responses as well as improving in efficacy of alerts over time. Thus, the program code, in some examples, generates, trains, applies, and updates a self-learning model (user profile) order to optimize alert choice efficacy.

Figure 6:
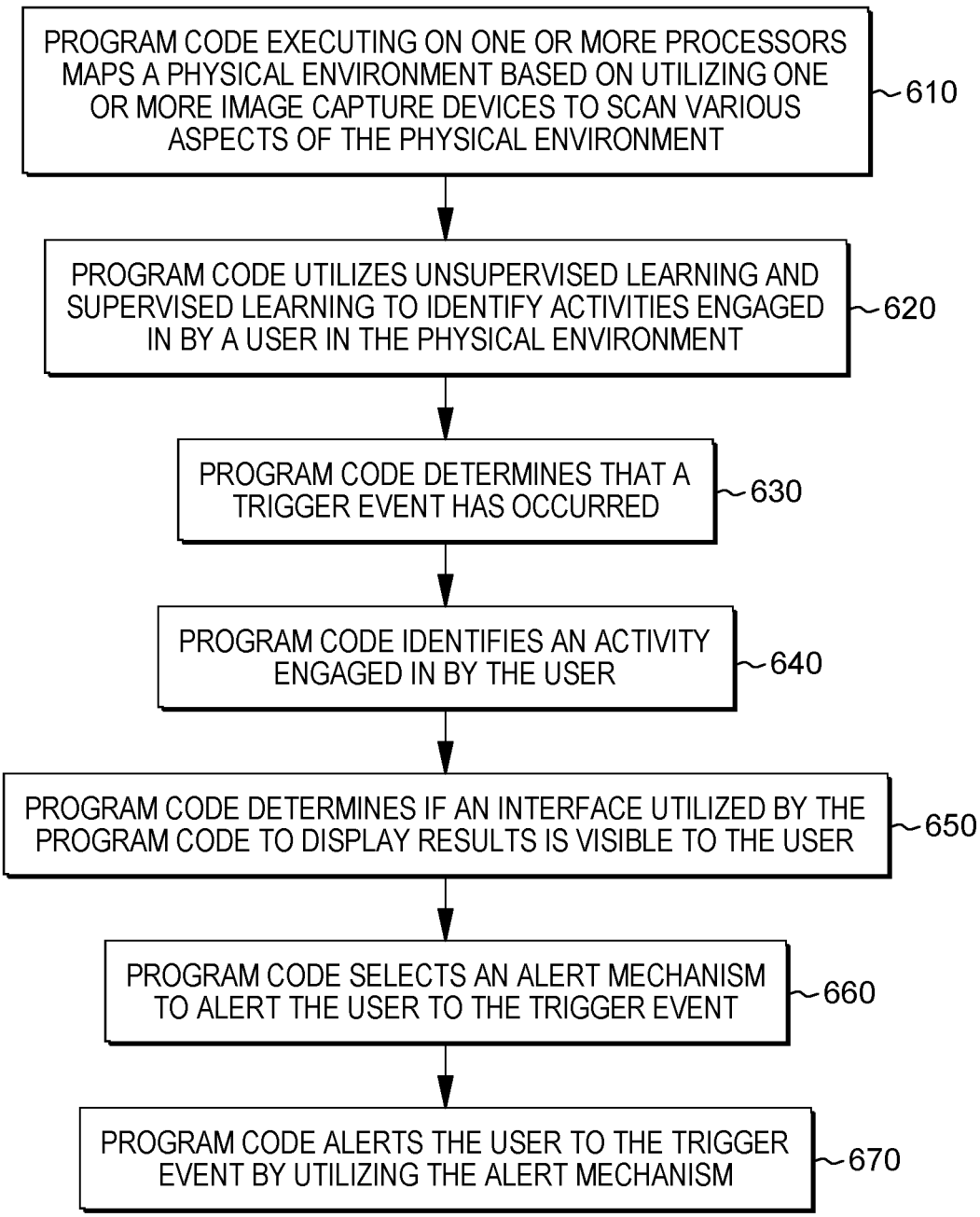
FIG. 6 is a workflow that illustrates how various aspects of the systems and methods described herein work together.

FIG. 6 is a workflow 600 that illustrates various aspects of some examples. In the illustrated example, program code executing on one or more processors maps a physical environment based on utilizing one or more image capture devices to scan various aspects of the physical environment (610). As part of this mapping, the program code can identify contamination levels and features associated with objects in the physical environment. The program code utilizes unsupervised learning and supervised learning to identify activities engaged in by a user in the physical environment (620). As discussed above, the program code can make these determinations with the assistance of a Deep Auto-Encoder-Set Network for Activity Recognition. The impetus for activity recognition is for the program code to determine whether a user is visually engaged with an interface that the program code utilizes to provide results. As discussed herein, the program code can provide results in the GUI of a personal computing device and/or the program code can project results on a physical environment. Based on the mapping, the program code determines that a trigger event has occurred (630). For example, the program code can identify a contamination level or feature pre-configured to be the trigger event and these can each be trigger events. The program code identifies an activity engaged in by the user (640). As discussed here and illustrated in FIG. 4, the program code can use a Deep Auto-Encoder-Set Network for Activity Recognition to identify the activity. Based on identifying the activity, the program code determines if an interface utilized by the program code to display results is visible to the user (650). The information regarding whether a given activity enables a user to view results can be pre-configured or automatically determined. For example, if a user is involved in an activity where the focus of the user is not on the display generated by the program code, the program code can determine that the user cannot view the results, if displayed. Activities that do not enable a user to view the interface would include an activity where a user is utilizing a device that includes the interface for another purpose as well as activities where the activity would be interrupted by the user viewing the interface (e.g., exercise, physical activity, etc.). In some examples, once the program code identifies the activity, the program code can reference a pre-configured compendium of activities to make this determination. Based on determining that the interface utilized by the program code to display results is not visible to the user, the program code selects an alert mechanism to alert the user to the trigger event (660). The program code alerts the user to the trigger event, based on the selecting, utilizing the alert mechanism (670). Once the user has been alerted to the trigger event, the hope is that the user views data associated with the trigger event, as provided by the program code, through the interface.

As discussed above, an advantage of examples disclosed herein over existing environmental safety alerts is that in examples herein, program code executing on one or more processors can convey safety alerts to users regardless of what activities the user is engaged in and can provide these alerts within a timely fashion. Once a user touches a contaminated surface in that user's vicinity, the timing for a warning has passed. The real-time alerting utilized in examples herein can be understood as a smart interjecting strategy. Through this strategy, the program code operates in the background and does not disturb a user's activities, even if the user is utilizing a device that would provide the alerts, unless and until the program code provides an alert. In the examples herein, the trigger events for these alerts can be customized based on various factors including levels of severity (e.g., as determined by an AR sensory device through continuous visual monitoring).

Various users may customize aspects of the examples herein in order to take advantage of the functionality. As noted earlier, a smartphone user may configure the program code to identify certain contaminants, for example, by utilizing a GUI that enables the user to select the bacteria and viruses that this user is most concerned about. Settings in which the examples herein could be of interest include, but are not limited to: retail establishments, gyms, doctor's offices, and/or libraries. Utilizing some embodiments of the present invention, retailers could share the information provided by the program code with other users for the store chain, including with the corporate offices of the retailer. Each of these environments are discussed in more detail below, however, these environments are non-limiting examples and provided for illustrative purposes only. Additionally, in each of these environments, utilizing aspects of some embodiments of the present invention is advantageous because proprietors need no longer manually keep track of when items have been cleaned or disinfected because the program code will automatically determine if the items have recently been disinfected and thus safe to touch.

Retailers could use reports regarding contamination to create floorplans and product displays. For example, if product A is on a lower shelf, then it is probably not touched as much. But if product A gets moved to a higher shelf location, it is more likely to be touched more often. If product B is on a shelf where it is expected to be touched frequently but is not, perhaps the product is unpopular and can be removed from the store. The program code can identify items that have been touched frequently and develop a strategy for enhanced cleaning and/or sanitizing schedule of high-touch items. The use of aspects of embodiments of the present invention in a retail environment would also benefit users who could use the program code to select items that have been touched less frequently than others.

Figure 8:
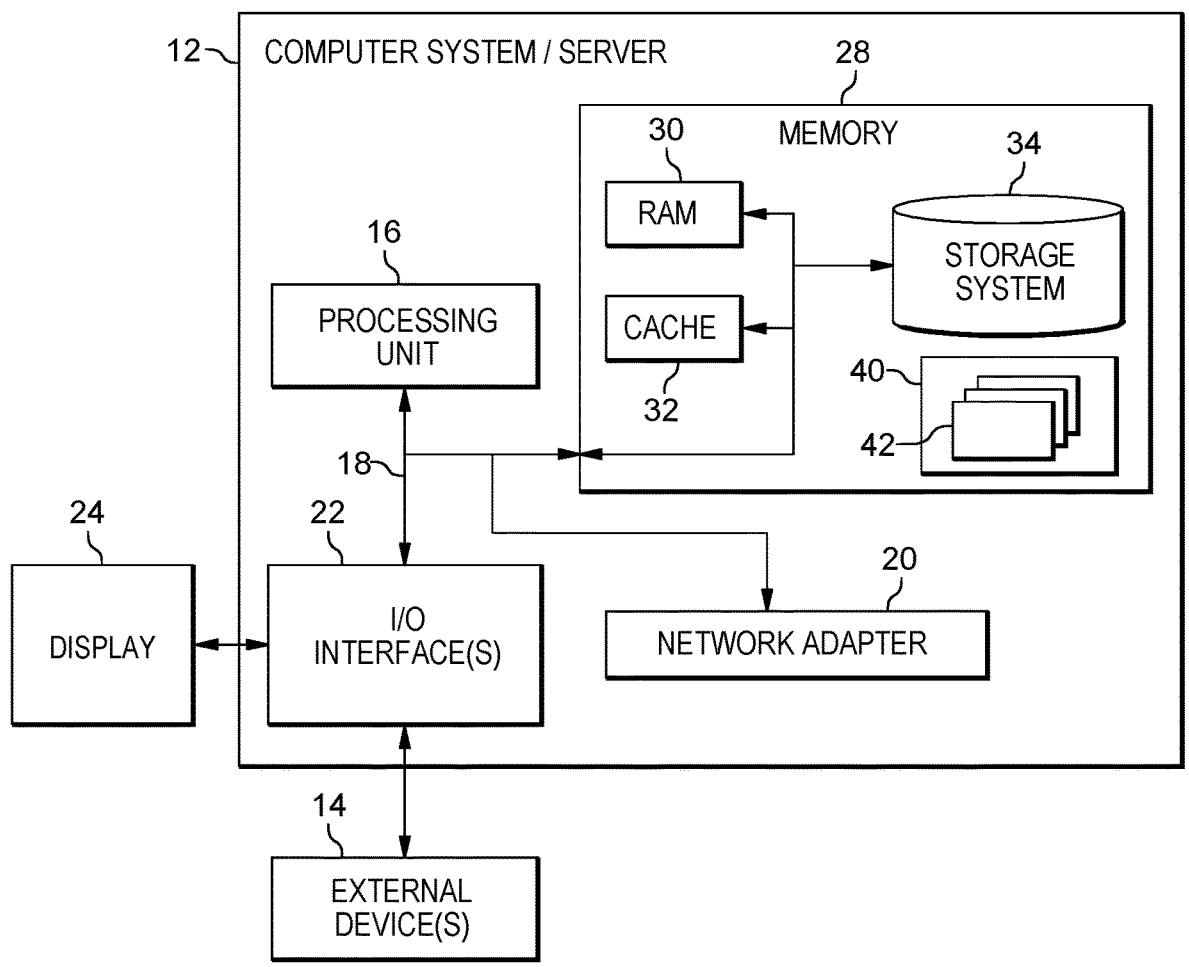
FIG. 8 depicts on embodiment of a computing node that can be utilized in a cloud computing environment.

Gym managers could utilize data provided by the program code in embodiments of the present invention to determine what equipment is used the most often and to inform future purchasing decisions. Additionally, the program code could indicate which equipment should be sanitized at various times and assist a gym manager in creating a sanitization schedule that protects the health of the individuals who frequent the gym. The program code could also determine the efficacy of the equipment sanitation process. The program code will detect when equipment, which was supposedly sanitized, is still contaminated, by displaying the equipment as red (see, FIG. 1, or with another indicator of contamination). Gym patrons would also benefit from using aspects of embodiments of the present invention because they would be able, with the assistance of the visuals provided by the program code, to select workout equipment is safe to use. FIG. 8 provides an example of how the program code could generate a visualization for a gym environment. In this example, equipment numbers 1, 2 and 5 are surrounded with a read border to indicate that they are not sanitized. Equipment 4 is yellow, meaning that a user should proceed with caution. Meanwhile, equipment 3 is green and therefore safe for use. Thus, a user selecting between equipment 3 and equipment 4, which are both treadmills, is advised by the program code's display to select equipment 4.

A manager of a doctor's office (or another healthcare provider office) could utilize an embodiment of the present invention to determine if its various offices and public areas (e.g., exam rooms, waiting rooms) are contaminated. For example, the program code could project or and/or display indicators of safety or lack thereof (see, FIG. 1) in a waiting room. Patients would likewise benefit from utilizing aspects of embodiments of the present invention because they could verify that a waiting room and/or an exam room has been disinfected properly before entering the space(s).

A library manager could utilize aspects of some embodiments of the present invention to determine whether a given item should be removed from circulation (because it was touched too frequently). Patrons of the library could utilize aspects of embodiments of the present invention to verify that books and magazines are safe to handle.

Embodiments of the present invention include a computer-implemented method, a computer program product, and a computer system where, in some examples, program code executing on one or more processors utilize a physical environment based on utilizing one or more image capture devices to scan aspects of the physical environment. The mapping can comprise identifying contamination levels and features associated with objects in the physical environment. The program code utilizes unsupervised learning and supervised learning to identify activities engaged in by a user in the physical environment. Based on the mapping, the program code determines that a trigger event has occurred. The trigger event can comprise the one or more processors identifying a contamination level or feature pre-configured to be the trigger event. The program code identifies an activity engaged in by the user. Based on the identifying, the program code determines if a user interface utilized by the program code to display results is visible to the user. Based on determining that the interface utilized by the program code to display results is not visible to the user, the program code selects an alert mechanism to alert the user to the trigger event. The program code alerts the user to the trigger event, based on the selecting, utilizing the alert mechanism.

In some examples, the program code determining if the user interface utilized by the program code to display results is visible to the user comprises the program code referencing a pre-configured compendium.

In some examples, the program code monitors a response of the user to the alert mechanism. The monitoring can include the program code obtaining, for each alert and for each type of type of alert mechanism to the user, a timing value reflecting time between the alert and the user viewing data associated with the trigger event.

In some examples, the program code obtains timing values for various alerts to the user. The program code generates, based on the timing values, a user profile, where the user profile ranks the various alerts by the alert mechanism from shortest timing value to longest timing value of the timing values to determine efficacy levels for each alert mechanism for the user. The program code updates the user profile, based on the efficacy levels and any change in efficacy levels, over the time.

In some examples, the program code selects the alert mechanism to alert the user to the trigger event comprises by obtaining the user profile. The program code selects the alert mechanism associated with a highest efficacy level.

In some examples, the program code maps the physical environments by controlling a smart camera embedded with a mixed reality device to scan the aspects of the physical environment.

In some examples, the program code maps the physical environment by utilizing a scanning mechanism to identify the objects in the physical environment.

In some examples, the program code identifies the objects to obtain data related to the anti-bacterial properties of materials that comprise the objects.

In some examples, the scanning mechanism is a one-stage detection model selected from the group consisting of: You Only Look Once and a Single-Shot Detector.

In some examples, the program code utilizing the unsupervised learning and the supervised learning includes: the program code obtaining data from one or more sensors proximate to the user and the program code executing a Deep Auto-Encoder-Set Network for Activity Recognition to identify the activities engaged in by the user in the physical environment.

In some examples, the unsupervised learning includes: the program code obtaining unlabeled sensor measurements from sensors proximate to the user. The unsupervised learning can also include the program code learning, from the unlabeled sensor measurements, feature representations for activity sets to train an activity recognition model.

In some examples, the program code the supervised learning includes the program code leveraging label information from a data source, to extract more discriminative features than the feature representations from the unlabeled sensor data.

In some examples, the program code trains the activity recognition model, with the feature representations and the more discriminative features to generate the activity sets for sensory data from the sensors.

In some examples, the program code the alert mechanism comprises one or more of: audio interleaving, visual injection into an ongoing visual session, haptic feedback, and auditory feedback.

In some examples, the program code provides the user interface to enable the user to view the contamination levels and the features associated with the objects in the physical environment. The program code providing the user interface includes in the program code displaying, in a graphical user interface on a computing device, a digital representation of the physical environment and the program code overlaying, on the digital representation of the physical environment, indicators on a portion of the objects in the digital representation, where the indicators correlate with the contamination levels.

In some examples, the program code provides the user interface to enable the user to view the contamination levels and the features associated with the objects in the physical environment. In providing the user interface, the program code projects, utilizing a projection system, on the physical environment, indicators on a portion of the objects, where the indicators correlate with the contamination levels.

In some examples, the one or more image capture devices are selected from the group consisting of: one or more video cameras, one or more spectroscopy cameras, and one or more infrared cameras.

In some examples, the program code transmits a command to a robotic cleaning device to mitigate the trigger event.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In FIG. the one or more servers 210 as well as the one or more resources and databases 280 can comprise cloud computing nodes 10 and the program code can be executed and/or stored on a cloud computing node 10 (FIG. 8). The one or more servers 210 and the one or more resources or databases 280 if not a cloud computing nodes 10, then one or more general computing nodes that include aspects of the cloud computing node 10. In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
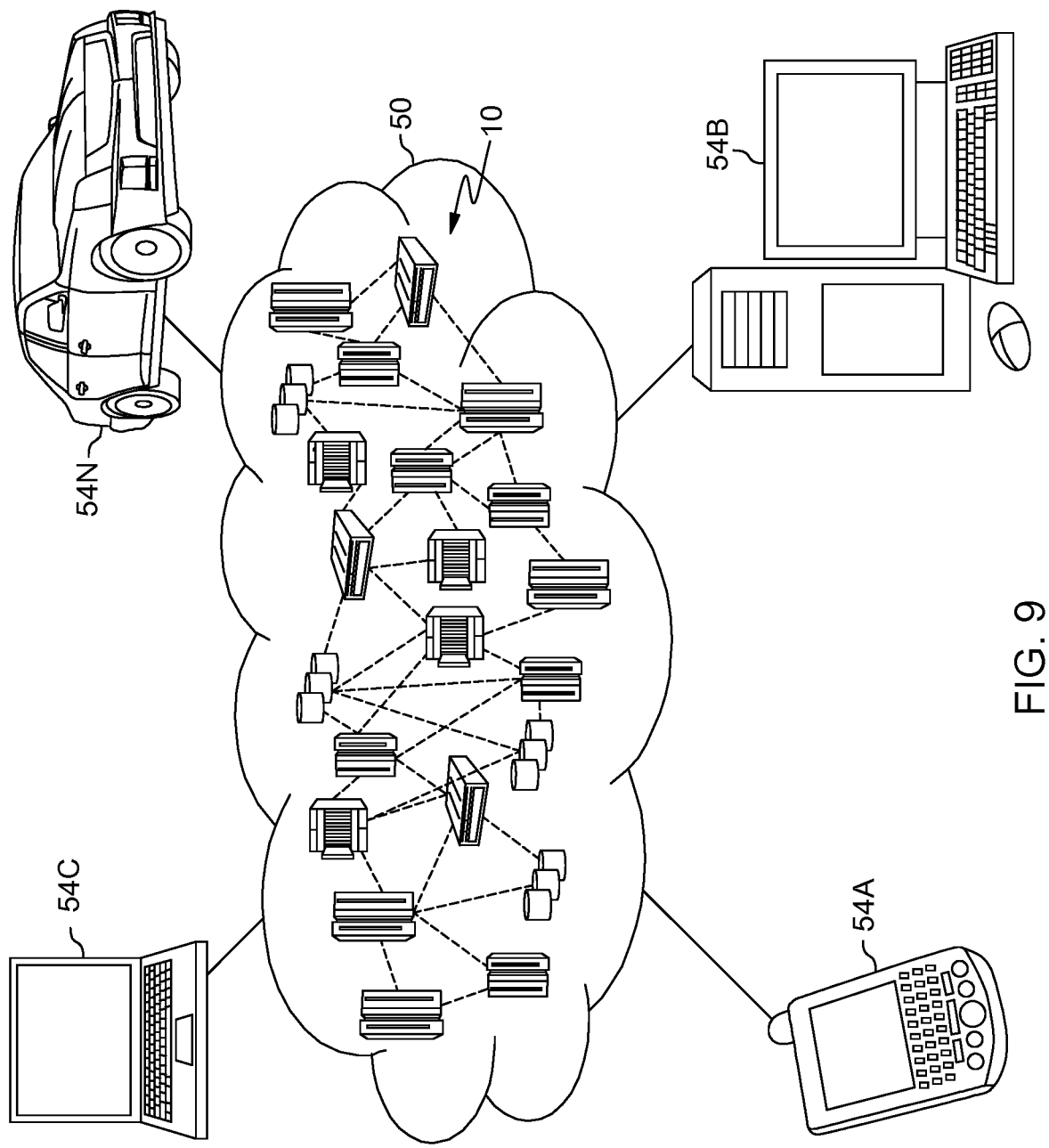
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
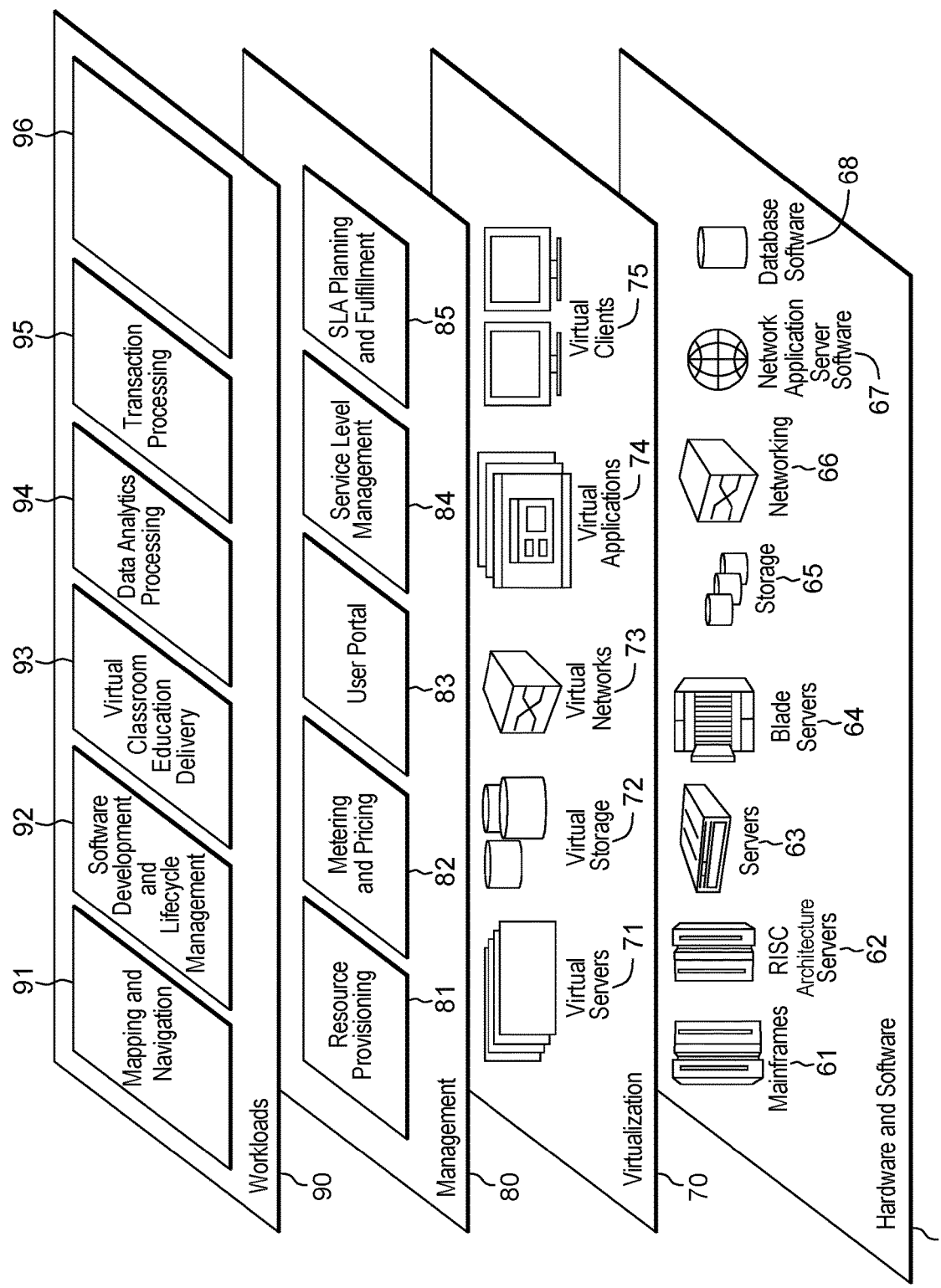
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Workloads can also include virtual examination centers or online examinations (not pictured).

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing safety information about a physical environment to users in the environment even if they are not paying attention to their surroundings 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
mapping, by one or more processors, a physical environment based on utilizing one or more image capture devices to scan aspects of the physical environment, wherein the mapping comprises identifying contamination levels and features associated with objects in the physical environment;
utilizing, by the one or more processors, unsupervised learning and supervised learning to identify activities engaged in by a user in the physical environment;
based on the mapping, determining, by the one or more processors, that a trigger event has occurred, wherein the trigger event comprises the one or more processors identifying a feature pre-configured to be the trigger event;
identifying, by the one or more processors, an activity engaged in by the user, wherein a convolutional neural network (CNN) automatically extracts high-level features by processing raw sensory data to extract discriminative features, wherein the CNN associates the discriminative features with a set of activity elements to predict the activity engaged in by the user, wherein the feature pre-configured to be the trigger event is switching from an initial activity in which the user is attentive to the physical environment to the activity predicted by the CNN, and wherein, based on the trigger event, the one or more processors determine whether the physical environment includes a contaminated or sanitized surface and select an alert mechanism to notify the user of the contamination based on the activity predicted;
based on the identifying, determining, by the one or more processors, if a user interface utilized by the program code to display results is visible to the user in light of the activity;
in response to determining that the interface utilized by the program code to display results is not visible to the user due to the activity, selecting, by the one or more processors, the alert mechanism to alert the user to the trigger event; and
alerting, by the one or more processors, the user to the trigger event, utilizing the alert mechanism.

2. The computer-implemented method of claim 1, wherein the determining if the user interface utilized by the program code to display results is visible to the user comprises:
referencing, by the one or more processors, a pre-configured compendium.

3. The computer-implemented method of claim 1, further comprising:

monitoring, by the one or more processors, a response of the user to the alert mechanism, wherein the monitoring comprises:
obtaining, by the one or more processors, for each alert and for each type of type of alert mechanism to the user, a timing value reflecting time between the alert and the user viewing data associated with the trigger event.

4. The computer-implemented of claim 3, further comprising:
obtaining, by the one or more processors, over time, timing values for various alerts to the user;
generating, by the one or more processors, based on the timing values, a user profile, wherein the user profile ranks the various alerts by the alert mechanism from shortest timing value to longest timing value of the timing values to determine efficacy levels for each alert mechanism for the user; and
updating, by the one or more processors, the user profile, based on the efficacy levels and any change in efficacy levels, over the time.

5. The computer-implemented method of claim 4, wherein the selecting the alert mechanism to alert the user to the trigger event comprises:
obtaining, by the one or more processors, the user profile; and
selecting, by the one or more processors, the alert mechanism, wherein the alert mechanism is associated with a highest efficacy level.

6. The computer-implemented method of claim 1, wherein the mapping further comprises controlling a smart camera embedded with a mixed reality device to scan the aspects of the physical environment.

7. The computer-implemented method of claim 1, wherein the mapping comprises utilizing a scanning mechanism to identify the objects in the physical environment.

8. The computer-implemented method of claim 7, wherein identifying the objects in the physical environment comprises obtaining data related to the anti-bacterial properties of materials that comprise the objects.

9. The computer implemented method of claim 7, wherein the scanning mechanism is a one-stage detection model selected from the group consisting of: You Only Look Once and a Single-Shot Detector.

10. The computer-implemented method of claim 1, wherein utilizing the unsupervised learning and the supervised learning comprises:
obtaining, by the one or more processors, data from one or more sensors proximate to the user; and
executing, by the one or more processors, a Deep Auto-Encoder-Set Network for Activity Recognition to identify the activities engaged in by the user in the physical environment.

11. The computer-implemented method of claim 1, wherein the unsupervised learning comprises:
obtaining, by the one or more processors, unlabeled sensor measurements from sensors proximate to the user; and
learning, from the unlabeled sensor measurements, feature representations for activity sets to train an activity recognition model.

12. The computer-implemented method of claim 11, wherein the supervised learning comprises:
leveraging, by the one or more processors, label information from a data source, to extract more discriminative features than the feature representations from the unlabeled sensor data.

13. The computer-implemented method of claim 12, further comprising:
    training, by the one or more processors, the activity recognition model, with the feature representations and the more discriminative features to generate the activity sets for sensory data from the sensors.

14. The computer-implemented method of claim 1, wherein the alert mechanism comprises one or more of: audio interleaving, visual injection into an ongoing visual session, haptic feedback, and auditory feedback.

15. The computer-implemented method of claim 1, further comprising:
    providing, by the one or more processors, the user interface to enable the user to view the contamination levels and the features associated with the objects in the physical environment, the providing comprising:
    displaying, by the one or more processors, in a graphical user interface on a computing device, a digital representation of the physical environment; and
    overlaying, by the one or more processors, on the digital representation of the physical environment, indicators on a portion of the objects in the digital representation, wherein the indicators correlate with the contamination levels.

16. The computer-implemented method of claim 1, further comprising:
    providing, by the one or more processors, the user interface to enable the user to view the contamination levels and the features associated with the objects in the physical environment, the providing comprising:
    projecting, by the one or more processors, utilizing a projection system, on the physical environment, indicators on a portion of the objects, wherein the indicators correlate with the contamination levels.

17. The computer-implemented method of claim 1, wherein the one or more image capture devices are selected from the group consisting of: one or more video cameras, one or more spectroscopy cameras, and one or more infrared cameras.

18. The computer-implemented method of claim 1, further comprising:
    transmitting, by the one or more processors, a command to a robotic cleaning device to mitigate the trigger event.

19. A computer program product comprising:
    a computer readable storage medium readable by one or more processors of a shared computing environment comprising a computing system and storing instructions for execution by the one or more processors for performing a method comprising:
    mapping, by the one or more processors, a physical environment based on utilizing one or more image capture devices to scan aspects of the physical environment, wherein the mapping comprises identifying contamination levels and features associated with objects in the physical environment;
    utilizing, by the one or more processors, unsupervised learning and supervised learning to identify activities engaged in by a user in the physical environment;
    based on the mapping, determining, by the one or more processors, that a trigger event has occurred, wherein the trigger event comprises the one or more processors identifying a feature pre-configured to be the trigger event;
    identifying, by the one or more processors, an activity engaged in by the user, wherein a convolutional neural network (CNN) automatically extracts high-level features by processing raw sensory data to extract discriminative features, and wherein the CNN associates the discriminative features with a set of activity elements to predict the activity engaged in by the user, wherein, based on the trigger event, the one or more processors determine whether the physical environment includes a contaminated or sanitized surface and select an alert mechanism to notify the user of the contamination based on the activity predicted;
    based on the identifying, determining, by the one or more processors, if a user interface utilized by the program code to display results is visible to the user in light of the activity;
    in response to determining that the interface utilized by the program code to display results is not visible to the user due to the activity, selecting, by the one or more processors, the alert mechanism to alert the user to the trigger event; and
    alerting, by the one or more processors, the user to the trigger event, utilizing the alert mechanism.

20. A computer system comprising:
    a memory;
    the one or more processors in communication with the memory;
    program instructions executable by the one or more processors to perform a method, the method comprising:
    mapping, by the one or more processors, a physical environment based on utilizing one or more image capture devices to scan aspects of the physical environment, wherein the mapping comprises identifying contamination levels and features associated with objects in the physical environment;
    utilizing, by the one or more processors, unsupervised learning and supervised learning to identify activities engaged in by a user in the physical environment;
    based on the mapping, determining, by the one or more processors, that a trigger event has occurred, wherein the trigger event comprises the one or more processors identifying a feature pre-configured to be the trigger event;
    identifying, by the one or more processors, an activity engaged in by the user, wherein a convolutional neural network (CNN) automatically extracts high-level features by processing raw sensory data to extract discriminative features, wherein the CNN associates the discriminative features with a set of activity elements to predict the activity engaged in by the user, wherein, based on the trigger event, the one or more processors determine whether the physical environment includes a contaminated or sanitized surface and select an alert mechanism to notify the user of the contamination based on activity predicted;
    based on the identifying, determining, by the one or more processors, if a user interface utilized by the program code to display results is visible to the user in light of the activity;
    in response to determining that the interface utilized by the program code to display results is not visible to the user due to the activity, selecting, by the one or more processors, the alert mechanism to alert the user to the trigger event; and alerting, by the one or more processors, the user to the trigger event, utilizing the alert mechanism.

* * * * *